(12) United States Patent
Seok et al.

(10) Patent No.: US 8,451,891 B2
(45) Date of Patent: May 28, 2013

(54) RATE CONTROL METHOD FOR VIDEO ENCODER USING KALMAN FILTER AND FIR FILTER

(75) Inventors: Jinwuk Seok, Daejeon (KR); Kisong Yoon, Daejeon (KR); Bumho Kim, Daejeon (KR); Jeong-Woo Lee, Daejeon (KR); Yeon Jeong Jeong, Daejeon (KR); Jung Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 411 days.

(21) Appl. No.: 12/787,063

(22) Filed: May 25, 2010

(65) Prior Publication Data

US 2011/0110421 A1    May 12, 2011

(30) Foreign Application Priority Data

Nov. 10, 2009  (KR) .................... 10-2009-0108260

(51) Int. Cl.
*H04N 7/12*   (2006.01)
*H04N 11/04*  (2006.01)
*G06K 9/36*   (2006.01)
*G06K 9/00*   (2006.01)

(52) U.S. Cl.
USPC ................ 375/240.03; 375/240.24; 382/232; 382/251

(58) Field of Classification Search
None
See application file for complete search history.

(56) References Cited

U.S. PATENT DOCUMENTS

| | | | |
|---|---|---|---|
| 6,205,177 B1 * | 3/2001 | Girod et al. ............. 375/240.14 |
| 6,233,226 B1 * | 5/2001 | Gringeri et al. ............. 370/252 |
| 2002/0111801 A1 * | 8/2002 | Wu et al. ...................... 704/230 |
| 2002/0116199 A1 * | 8/2002 | Wu et al. ...................... 704/500 |
| 2003/0206558 A1 * | 11/2003 | Parkkinen et al. .......... 370/477 |
| 2004/0164882 A1 * | 8/2004 | Touyama et al. ............... 341/51 |
| 2004/0179617 A1 * | 9/2004 | Cai et al. .................. 375/240.26 |
| 2005/0084007 A1 * | 4/2005 | Lightstone et al. ...... 375/240.03 |
| 2005/0175093 A1 | 8/2005 | Haskell et al. |
| 2005/0219213 A1 * | 10/2005 | Cho et al. ...................... 345/158 |
| 2006/0018553 A1 * | 1/2006 | Lee ............................... 382/232 |
| 2007/0009027 A1 | 1/2007 | Zhu et al. |
| 2007/0122047 A1 | 5/2007 | Tsuru et al. |
| 2008/0198932 A1 * | 8/2008 | Sei .......................... 375/240.16 |
| 2009/0046778 A1 | 2/2009 | Lee et al. |
| 2009/0067493 A1 | 3/2009 | Jun et al. |
| 2009/0087084 A1 * | 4/2009 | Neigovzen et al. ........... 382/159 |

FOREIGN PATENT DOCUMENTS

| | | |
|---|---|---|
| KR | 10-2006-0122775 A | 11/2006 |
| KR | 10-2006-0132761   | 12/2006 |
| KR | 10-2008-0010696 A | 1/2008  |
| KR | 10-2009-0018527 A | 2/2009  |
| KR | 10-2009-0044031 A | 5/2009  |

OTHER PUBLICATIONS

"Discrete LQ Rate Control for MPEG2 Video Streaming System", Xiaofei Zhou et al., Journal of Multimedia, vol. 3, No. 2, Jun. 2008.
"A New Macroblock-Layer Rate Control for H. 264/AVC Using Quadratic R-D Model", Nam-Rye Son et al., LNCS, pp. 822-831, 2006.
"A Context-Adaptive Prediction Scheme for Parameter Estimation in H. 264/AVC Macroblock Layer Rate Control", Jianpeng Dong et al., IEEE Transactions on Circuits and Systems for Video Technology, vol. 19, No. 8, Aug. 2009.

* cited by examiner

*Primary Examiner* — Joseph Ustaris
*Assistant Examiner* — Frederick Bailey
(74) *Attorney, Agent, or Firm* — Kile Park Reed & Houtteman PLLC

(57) ABSTRACT

A rate control method per block for a video encoder, includes estimating an average bit rate of a block; and determining a variation of a quantization coefficient such that an objective function based on the difference between an objective bit rate and the estimated average bit rate is minimized.

12 Claims, 3 Drawing Sheets

RATE CONTROL METHOD FOR VIDEO ENCODER USING KALMAN FILTER AND FIR FILTER

CROSS-REFERENCE TO RELATED APPLICATIONS

The present invention claims priority to Korean Patent Application No. 2009-0108260 filed on Nov. 10, 2009, which is incorporated herein by reference.

FIELD OF THE INVENTION

The present invention relates to a rate control method for a video encoder; and more particularly, to a technology of rate control for a video encoder by estimating an average bit rate of a block and determining a quantization parameter of the block.

BACKGROUND OF THE INVENTION

Recently a digital image technology has been developed as the way of compressing video data efficiently because a digital image data, which is used in a digital cinema, a high-resolution television, a VOD (video on demand) receiver, a personal computer supporting MPEG (Moving Picture Experts Group) images, a video game console, a digital broadcasting receiver, and a cable television and the like, sharply increases during a digitalization of analog signals. Especially, many video compression standards including a MPEG-4 Part 10 AVC/H.264 reduce total data for transmitting video and increase a transmission rate by compressing to encode the video data. These standards reduce a temporal redundancy by using a correlation between continuous frames, and generally compress to encode the video by using a motion estimation technology and a motion compensation technology. That is, many video compression standards including the MPEG-4 Part 10 AVC/H.264 divide a present image into a block having a predetermined size; detect a most matching block with the present image block within a detection area of a previous image; and encode a motion vector which is difference components between the blocks. For example, the video encoder conform to the MPEG-4 Part 10 AVC/H.264 uses a video compression method per block unit which performs calculations by macroblock unit.

Meanwhile, depending on a motion degree, within a single frame, a detail or complexity degree of an object expressed by an image, and an easiness of prediction, the amount of residue data for each block which is the difference between a predicted image and an original image varies and a bit rate for encoding the residue data also varies. For example, the video encoder generates more bits for an input image having a high motion, detail, or complexity degree, and generates fewer bits for an input image having a low motion, detail, or complexity degree. The video encoder performs rate control to change the bit rate generated for each block in this manner depending on the frame. This rate control is for obtaining the optimum rate-distortion by assigning the bits properly for each frame and each block with respect to a predetermined objective bit rate. In this manner, the video encoder performs rate control to change a bit rate generated for each block in accordance with the frame. The rate control is for obtaining the optimum RD (Rate-Distortion) by assigning the bit for each frame and block with respect to a predetermined objective bit rate. The rate control can be performed such that the bit rate is adjusted by varying the scaling value used for quantization of a transformation coefficient which is obtained by performing a transformation such as a DCT (Discrete Cosine Transform) to the residue data. Here, the scaling value is a quantization parameter. To the block necessary for more bits due to the large residue, the lower quantization parameter is used for encoding the more data. And to the block necessary for fewer bits due to the small residue, the higher quantization parameter is used for encoding the less data.

In case of the MPEG-4 Part 10 AVC/H.264, there are eight different block modes to obtain an efficient compression and a high-definition simultaneously. Among each mode, the mode in which an objective function based on a RDO (Rate Distortion Optimization) has minimum value is selected. However, the amount of calculation is highly increased because various calculations for encoding to each mode are performed independently to select the optimum mode among eight different block modes, and the optimum mode needs to be selected again according to the newly selected quantization parameter in case that the bit rate is adjusted per block to obtain the optimum result by balancing the picture quality improvement and the bit rate reducing. That is, if various encoding calculation including the transformation such as the DCT process, quantization process and the like are used for rate control, the amount of calculation for real-time video encoding is rapidly increases. Accordingly, the efficient rate control for block unit is required for the rapid video encoder by reducing the calculation time and for high definition simultaneously.

SUMMARY OF THE INVENTION

In view of the above, the present invention provides a rate control method and apparatus for a video encoder that can reduce an amount of calculation for rate control by estimating an average bit rate of a block and adjusting a quantization parameter of the block to satisfy the optimum control condition.

Further, the present invention which is not described herein will be understood by those skilled in the art from the following description.

In accordance with a first aspect of the present invention, there is provided a rate control method per block for a video encoder, the method including: estimating an average bit rate of a block; and determining a variation of a quantization coefficient such that an objective function based on the difference between an objective bit rate and the estimated average bit rate is minimized.

In accordance with a second aspect of the present invention, there is provided a rate control apparatus per block for a video encoder including: a bit rate generation obtaining unit measuring a generated bit rate of a block; a long term average bit rate estimation unit obtaining a long term average bit rate which is a estimated value of an average bit rate of the block by a long term prediction; a short term average bit rate estimation unit obtaining a short term average bit rate which is a estimated value of an average bit rate of the block by a short term prediction; a variation of quantization coefficient calculation unit determining a first variation according to a difference between a objective bit rate and the long term average bit rate, determining a second variation according to a difference between the objective bit rate and the short term average bit rate, and determining a third variation as a variation of a quantization coefficient based on the first variation and the second variation; and a quantization coefficient adjusting unit renewing the quantization coefficient by the third variation.

In accordance with an embodiment of the present invention, an amount of calculation for rate control is reduced by estimating an average bit rate of a block and adjusting a quantization parameter of the block to satisfy the optimum control condition in a video encoder, thereby obtaining a certain compressibility rate and high-definition.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
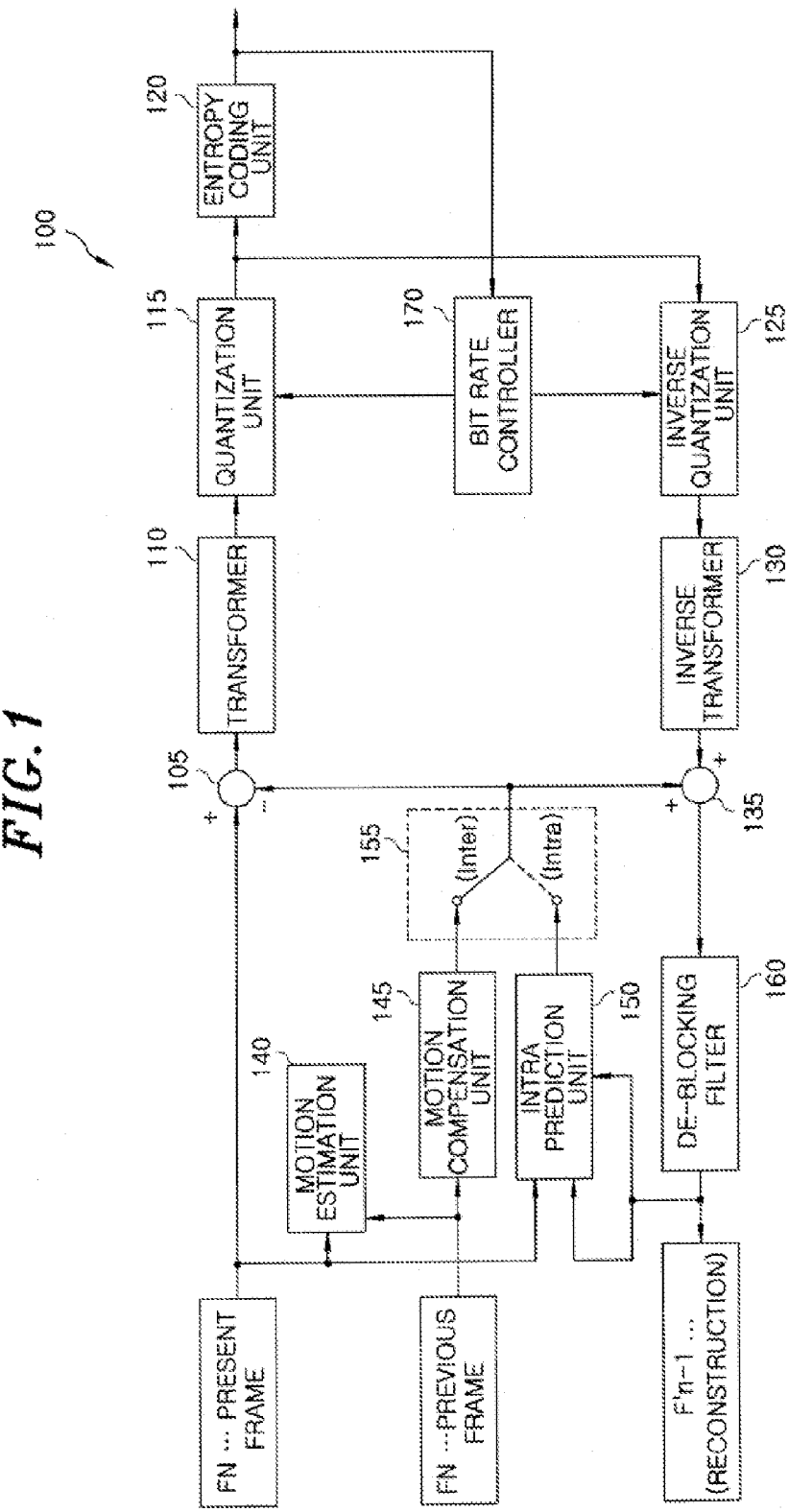
FIG. 1 shows an exemplary configuration of a video encoder performing rate control in accordance with an embodiment of the present invention.

Embodiments of the present invention will be described in detail with reference to the accompanying drawings which form a part hereof.

Further, in the following description and drawings, components having substantially the same configuration and function are denoted by like reference characters, and thus redundant description thereof will be omitted herein.

FIG. 1 shows an exemplary configuration of a video encoder performing rate control in accordance with the embodiment of the present invention.

As shown in FIG. 1, a video encoder 100 includes a subtracter 105, a transformer 110, a quantization unit 115, a entropy coding unit 120, an inverse quantization unit 125, a inverse transformer 130, an adder 135, a motion estimation unit 140, a motion compensation unit 145, an intra prediction unit 150, a mode controller 155, a de-blocking filter 160, and a bit rate controller 170. The video encoder 100, for example, can be configured to conform to video compression standard such as MPEG-4 Part 10 AVC/H.264.

The subtracter 105 outputs residue data obtained by excluding an intra predicted or motion compensated image from an original image to the transformer 110. An output terminal of the mode controller 155 is switched to the intra predicted image terminal by the intra prediction unit 150 or the motion compensated image terminal by the motion compensation unit 145 depending on the intra type image or the inter type image.

The transformer 110 performs a transformation by block unit with respect to the residue data inputted from the subtracter 105. Here, the transformation performed by the transformer 110, for example, can be a DCT (Discrete Cosine Transform) or an integer transform used basically in a MPEG-4 Part 10 AVC/H.264.

The quantization unit 115 quantizes a transformation coefficient obtained by the transformation of the transformer 110. Here, the size of the quantization step is determined by a quantization parameter. The transformation coefficient quantized by the quantization unit 115 is serialized according to a predetermined scanning method before outputting to the entropy coding unit 120.

The entropy coding unit 120 performs entropy coding with respect to the transformation coefficient quantized by the quantization unit 115. Here, the entropy coding can be a VLC (Variable Length Coding) which reduces the number of bit by indicating the lower number for a frequent value among the quantized transformation parameter and indicating the higher number for a rare value among the quantized transformation parameter, or arithmetic coding based on the conditional probability. For example, the entropy coding unit 120 performs the entropy coding by using a CAVLC (Context Adaptive Variable Length Coding) or CABAC (Context Adaptive Binary Arithmetic Coding) of the MPEG-4 Part 10 AVC/H.264.

The inverse quantization unit 125 inversely quantizes the transformation parameter quantized by the quantization unit 115 to output to the inverse transformer 130.

The inverse transformer 130 inversely transforms the transformation parameter quantized inversely to output to the adder 135.

The adder 135 adds an intra predicted value by the intra prediction unit 150 or a motion compensated value by the motion compensation unit 145 to the inversely transformed data according to the switching of the mode controller 155 to output a restored image to the de-blocking filter 160.

The motion estimation unit 140 estimates a motion vector using an original image and a reference image to output to the motion compensation unit 145.

The motion compensation unit 145 performs a motion compensation using the reference image according to the motion vector estimated by the motion estimation unit 140.

The intra prediction unit 150 performs a intra prediction which is a process to reduce a space redundancy within a intra frame using a correlation of the adjacent blocks.

The de-blocking filter 160, as a loop filter to solve a blocking artifact which is a degradation of picture quality caused by calculations per block unit, performs a filtering with regard to the inputted image from the adder 135.

The bit rate controller 170 controls a bit rate by adjusting whole bit rate and the quantization parameter affecting the picture quality. More particularly, the bit rate controller 170 measures the bit rate generated per block from the final output of the video encoder 100, and adjusts the quantization parameter so that the generated bit rate is close to an objective bit rate. According to the quantization parameter adjusted by the bit rate controller 170, the quantization unit 115 performs the quantization with regard to the transformation coefficient. At this, the bit rate controller 170 performs a rate control in accordance with an embodiment of the present invention which will be described hereinafter.

First, in accordance with the embodiment of the present invention, a bit rate generation model among blocks for rate control of the video encoder assumes that the generated bit rate is equally divided to each block with regard to the bit rate assigned to a single frame, and the actually measured bit rate is generated in each block according to the complexity of the image. For example, if the number of block in a single frame is N, the bit rate of each block becomes T/N on average, but if the complexity degree of the image is higher, the actually measured bit rate becomes much more. Here, if the bit rate generated in $t^{th}$ block on average is x(t), the generated bit rate in $t^{th}$ block disturbed by the complexity of the image is y(t), and a disturb clause according to the complexity of the image is $\epsilon(t)$, said bit rate generation model among blocks is acquired by Equation 1:

$$x(t+1)=x(t)$$

$$y(t)=x(t)+\epsilon(t) \qquad \text{[Equation 1]}$$

where $\epsilon(t)$ is a white noise having a independent and identical distribution (IID) and assumes that the average is 0 and the variance is 1. If the increasing bit rate according to the complexity degree of the image is a, y(t) is acquired by Equation 2:

$$y(t)=x(t)+\epsilon(t)=x(t)+\bar{\epsilon}(t)+a \quad \text{[Equation 2]}$$

In this case, the bit rate can be controlled in a manner that a control input is induced to predict the average bit rate of each block x(t) and eliminate the increased bit rate.

Accordingly, in accordance with the embodiment of the present invention, an objective bit rate is set by calculating the average bit rate per block; the average bit rate relating to the block is estimated by measuring the actually generated bit rate per each block; and the bit rate is controlled such that an objective function based on the difference between the objective bit rate and the estimated average bit rate is minimized. Especially, in accordance with an embodiment of the present invention, by adjusting the quantization parameter using the variation of the quantization parameter in order for control input relating to the average bit rate per each block, the bit rate is controlled such that an objective function based on the difference between the objective bit rate and the estimated average bit rate is minimized.

In accordance with the embodiment of the present invention, the average bit rate per each block can be estimated by a long term prediction or a short term prediction. First, in accordance with the embodiment of the present invention, in case of the long term prediction which estimates the average bit rate generated in all blocks to $t_{th}$ block, because there exists the white noise having an independent and identical distribution in Equation 1, a minimum covariance estimator which minimizes a covariance of x(t−1) and $\hat{x}(t)$=E(x(t)|Y(t−1)) is used. Where, Y(t−1) is all bit rate actually measured to $(t-1)_{th}$ block. The covariance of x(t−1) and $\hat{x}(t)$=E(x(t)|Y(t−1)) is acquired by Equation 3:

$$P(t,t-1)=E((x(t-1)-\hat{x}(t))(x(t-1)-\hat{x}(t))^T|Y(t-1)) \quad \text{[Equation 3]}$$

In this case, in accordance with the embodiment of the present invention, the minimum covariance estimator is acquired by Equation 4:

$$\hat{x}(t+1)=\hat{x}(t)+K_t(y(t)-\hat{x}(t)) \quad \text{[Equation 4]}$$

Here, with regard to the covariance of the Equation 3, Equation 5 is acquired by the Equation 4:

$$\begin{aligned}P(t+1,t) &= E\big((x(t)-\hat{x}(t+1))(x(t)-\hat{x}(t+1))^T \mid Y(t)\big) \quad \text{[Equation 5]}\\ &= \operatorname{cov}((x(t)-\hat{x}(t+1))\mid Y(t))\\ &= \operatorname{cov}((x(t)-(\hat{x}(t)+K_t(y(t)-\hat{x}(t)))\mid Y(t))\\ &= \operatorname{cov}((x(t)-(\hat{x}(t)+K_tx(t)+K_t\varepsilon(t)-\\ &\quad K_t\hat{x}(t))\mid Y(t))\\ &= \operatorname{cov}((I-K_t)(x(t)-\hat{x}(t))+K_t\varepsilon(t))\mid Y(t))\\ &= (I-K_t)^2\operatorname{cov}(x(t)-\hat{x}(t)\mid Y(t))+K_t^2\\ &= P(t,t)-2K_tP(t,t)+(P(t,t)+1)K_t^2\end{aligned}$$

where, $K_t$ is an adaptation coefficient. Accordingly, because the minimum covariance estimator of the Equation 4 needs to satisfy the condition that the differential value of the covariance of the Equation 5 by $K_t$ is 0, the adaptation coefficient $K_t$ which satisfies the above condition is acquired by Equation 6:

$$\frac{\partial P(t+1,t)}{\partial K_t} = -2P(t,t)+2(P(t,t)+1)K_t = 0 \quad \text{[Equation 6]}$$

$$K_t = \frac{P(t,t)}{P(t,t)+1}$$

Here, by substituting the adaptation coefficient $K_t$ acquired by the Equation 6 for the Equation 5, a Riccati equation as Equation 7 can be acquired:

$$\begin{aligned}P(t+1,t) &= P(t,t)-2K_tP(t,t)+(P(t,t)+1)K_t^2 \quad \text{[Equation 7]}\\ &= P(t,t)-2\frac{P^2(t,t)}{P(t,t)+1}+\frac{P^2(t,t)}{P(t,t)+1}\\ &= \frac{P(t,t)}{P(t,t)+1}\end{aligned}$$

Because P(t,t)=1/t is one of the value which satisfies the Riccati equation of the Equation 7, the adaptation coefficient $K_t$ is $K_t$=1/(t+1). Accordingly, in accordance with the embodiment of the present invention, in case of predicting the average bit rate per each block by the long term prediction, a long term average bit rate can be acquired by performing the long term prediction using a Kalman filter as Equation 8:

$$\hat{x}(t+1) = \hat{x}(t)+\frac{1}{t+1}(y(t)-\hat{x}(t)) \quad \text{[Equation 8]}$$

$$\hat{x}(0) = 0$$

Next, in accordance with an embodiment of the present invention, the bit rate is controlled such that the objective function as Equation 9 is minimized by using the long term average bit rate acquired as above. At this, a state equation as the Equation 9 includes the control input in order to control the bit rate which generated depending on the complexity of the image:

$$ObjectFunction \quad J = \frac{1}{2}\sum_{t=0}^{N-1}(Y-\hat{x}(t))^2 \quad \text{[Equation 9]}$$

$$StateEquation \quad x(t+1) = x(t)+u(\varepsilon(t)\,q(t),\,dq(t))$$

where, Y is the objective bit rate for rate controlling as the calculated average bit rate per block, u(ϵ(t)q(t), dq(t)) is the control input, q(t) is the quantization coefficient, and dq(t) is the variation of the quantization coefficient q(t).

In accordance with the embodiment of the present invention, the optimum control condition based on a dynamic programming is calculated by defining Hamiltonian from the objective function and the control input as the Equation 9, and the bit rate is controlled based on the optimum control condition. By using the Equation 9 as above, the Hamiltonian for the optimum controlling is acquired by Equation 10:

$$H(t) \equiv \frac{1}{2}(Y-\hat{x}(t))^2 + \lambda u(\varepsilon(t),\,q(t),\,dq(t)) \quad \text{[Equation 10]}$$

Here, from the variation of Lagrangian multiplier λ to time, the differential condition of the Hamiltonian of the Equation 10 is acquired by Equation 11:

$$\frac{\partial \lambda}{\partial t} = -\frac{\partial H}{\partial \hat{x}(t)} = (Y - \hat{x}(t)) \qquad \text{[Equation 11]}$$

Here, the difference type of Equation 11 is acquired by Equation 12:

$$\lambda(t+1) - \lambda(t) = -\frac{\partial H}{\partial \hat{x}(t)} = (Y - \hat{x}(t)) \qquad \text{[Equation 12]}$$

The optimum control condition can be calculated by using the Hamiltonian of the Equation 10. That is, the optimum control condition can be calculated from the fact that the Hamiltonian inputted by the variation of the optimum quantization coefficient dq*(t) needs to be less than the Hamiltonian inputted by the variation of the random quantization coefficient dq(t). This can be acquired by Equation 13:

$$H(dq(t)) = \frac{1}{2}(Y - \hat{x}(t))^2 + \lambda(t)u(\varepsilon(t), q(t), dq(t)) \geq \qquad \text{[Equation 13]}$$
$$\frac{1}{2}(Y - \hat{x}(t))^2 + \lambda(t)u(\varepsilon(t), q(t), dq^*(t))$$

Here, in accordance with the embodiment of the present invention, the relationship between the generated bit rate and the quantization parameter, for example as the case of the MPEG-4 Part 10 AVC/H.264, could be negatively proportional. In this case, if the maximum value of possible $\varepsilon(t)$, when the quantization parameter is 0, is $B(\varepsilon(t),t)$ and the proportional constant of the quantization parameter and the bit rate is $m(t) > 0$, $\forall t \geq 0$, Equation 14 is acquired:

$$u(\varepsilon(t)q(t),dq(t))=B(\varepsilon(t),t)-m(t)(q(t)+dq(t)) \qquad \text{[Equation 14]}$$

In order to calculate the optimum control condition, by substituting the Equation 14 and the Equation 12 in turn for the Equation 13, Equation 15 is acquired:

$$\lambda(t)(B(t) - m(t)(q(t) + dq(t))) \geq \qquad \text{[Equation 15]}$$
$$\lambda(t)(B(t) - m(t)(q(t) + dq^*(t))) \Leftrightarrow$$
$$-\lambda(t)m(t)dq(t) \geq -\lambda(t)m(t)dq^*(t) \Rightarrow$$
$$(\lambda(t+1) - \lambda(t))m(t)dq(t) \geq (\lambda(t+1) - \lambda(t))m(t)dq^*(t) \Rightarrow$$
$$(Y - \hat{x}(t))m(t)dq(t) \geq (Y - \hat{x}(t))m(t)dq^*(t) \Rightarrow$$
$$(Y - \hat{x}(t))dq(t) \geq (Y - \hat{x}(t))dq^*(t)$$

Here, if dq(t) and dq*(t) is 0 the Equation 15 is always true, in case of $(Y-\hat{x}(t))$ is larger than 0 if dq(t) is larger than 0 and dq*(t) is smaller than 0 the Equation 15 is true, and in case of $(Y-\hat{x}(t))$ is smaller than 0 if dq(t) is smaller than 0 and dq*(t) is larger than 0 the Equation 15 is true. Accordingly, with regard to a random positive number M if the variation of the optimum quantization parameter dq*(t) is set so that Equation 16 becomes true, the optimum control which minimizes the objective function as the Equation 9 can be obtained.

$$dq^*(t) = \begin{cases} 0 & (Y - \hat{x}(t)) = 0 \\ -M & (Y - \hat{x}(t)) > 0 \\ M & (Y - \hat{x}(t)) < 0 \end{cases} \text{ or } dq(t) = 0. \qquad \text{[Equation 16]}$$

Meanwhile, if the variation of the quantization parameter dq(t) changes too frequently or the accumulated quantization value changes too rapidly, the picture quality can be degraded. Accordingly, in accordance with the embodiment of the present invention, the upper and lower limit for $(Y-\hat{x}(t))$ is imposed, and if $(Y-\hat{x}(t))$ exceeds the imposed upper and lower limit dq(t) is changed as Equation 17:

$$dq^*(t) = \begin{cases} 0 & \beta < (\hat{x}(t) - Y) \leq \alpha \\ -1 & (\hat{x}(t) - Y) < \beta \\ 1 & (\hat{x}(t) - Y) > \alpha \end{cases} \qquad \text{[Equation 17]}$$

Here, in accordance with an embodiment of the present invention, if dq(t) and dq*(t) is all 0 the Equation 15 is true, accordingly within the imposed upper and lower limit although dq*(t) is set to 0, the optimum control condition as calculated in the Equation 15 can be obtained. Additionally, in accordance with the embodiment of the present invention, the video encoder conform to a general video compression standard such as MPEG-4 Part 10 AVC/H.264 performs rate control for block such that dq(t) does not exceed ±2. Accordingly, the video encoder as above performs rate control to the long term average bit rate by using the Equation 17. At this, $\alpha$ as the upper limit of $(\hat{x}(t)-Y)$ is positive constant, and $\beta$ as the lower limit of $(\hat{x}(t)-Y)$ is negative constant. In accordance with an embodiment of the present invention, $\alpha$ and $\beta$ can be within a range of about 0.2 to 0.25.

Additionally, in accordance with the embodiment of the present invention, in case of the short term prediction which estimates the average bit rate of the block considering the short term influence according to the complexity of the specific block in the frame, a FIR filter as Equation 18 can be used:

$$\hat{x}_F(t+1) = \hat{x}_F(t) + \frac{1}{N_t}(y(t) - y(t - N_t)) \qquad \text{[Equation 18]}$$
$$\hat{x}(s) = 0 \quad \forall s \in [-N_t, 0]$$

Here, in accordance with an embodiment of the present invention, because the purpose of estimating the average bit rate of the block using the FIR filter is for reflecting the short term influence by the specific block in the frame for the rate control, the number of taps of the FIR filter $N_t$ can be set to, e.g., about 4.

After, the bit rate can be controlled by the similar manner of the optimum control method using the Kalman filter. Here, in accordance with an embodiment of the present invention, the similar process after the Equation 9 is applicable using the average bit rate estimated by the short term prediction. However, for the variation of the quantization parameter $dq_F^*$ to satisfy the optimum control condition calculated by the Hamiltonian, the specific upper and lower limit according to the short term prediction can be imposed, and $dq_F^*$ can be determined according to these upper and lower limit.

$$dq_F^*(t) = \begin{cases} 0 & \beta_F < (\hat{x}_F(t) - Y) \le \alpha_F \\ -1 & (\hat{x}_F(t) - Y) < \beta_F \\ 1 & (\hat{x}_F(t) - Y) > \alpha_F \end{cases} \quad \text{[Equation 19]}$$

Where, $\alpha_F$ upper limit of $(\hat{x}_F(t)-Y)$ is positive constant, and $\beta_F$ as the lower limit of $(\hat{x}_F(t)-Y)$ is negative constant. In this case, $\alpha_F$ can have similar value to that of $\alpha$. Additionally, the video compression standard such as MPEG-4 Part 10 AVC/H.264 has 32 bit per block if the bit generates, and has 8 bit if the bit generates only in one block among four blocks. In this case, $dq_F^*$ can be set to $-1$, and $Y-\beta_F$ can be set to 10.

Meanwhile, in accordance with an embodiment of the present invention, the rate control process through the long term influence by using the Kalman filter as the Equation 17, and the rate control process through the short term influence by using the FIR filter as the Equation 19, can be performed independently. For example, if the complexity of the specific block in the frame increases, the quantization parameter of total frame lasts high unnecessarily. According, in order to reflect the short term influence according to the complexity of the specific block in the frame for the rate control considering the whole block to $t_{th}$ block, the quantization parameter can be adjusted by combining properly the process of estimating the average bit rate using the Kalma filter and the process of estimating the average bit rate using the FIR filter. The process to determine the variation of the quantization parameter by combining the long term average bit rate estimated by the long term prediction and the short term average bit rate estimated by the short term prediction, will now described with reference to FIG. 2.

Figure 2:
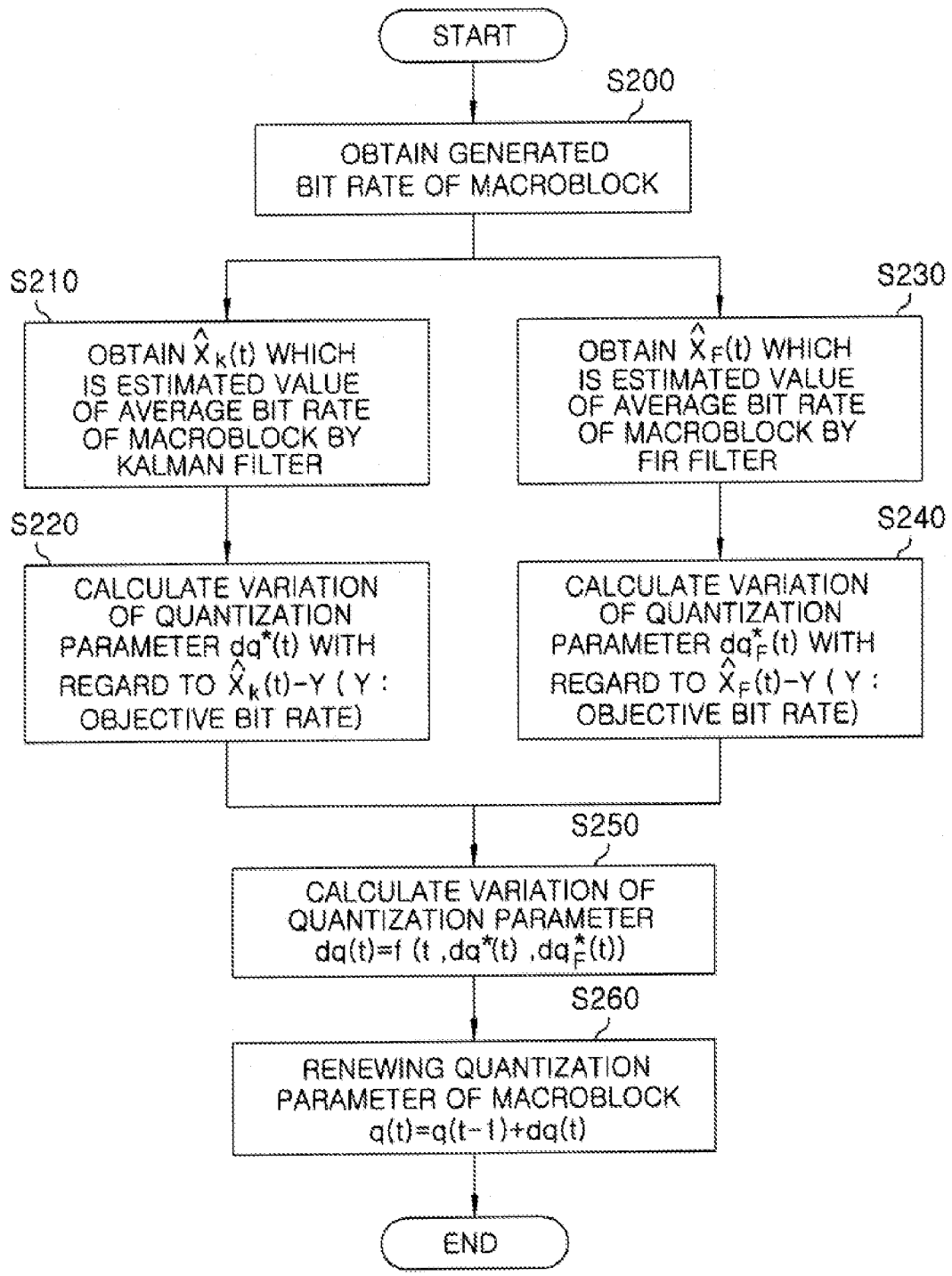
FIG. 2 is a flow chart showing an example of rate control process of a video encoder in accordance with the embodiment of the present invention.

FIG. 2 is a flow chart showing an example of rate control process of a video encoder in accordance with an embodiment of the present invention.

As shown in FIG. 2, the video encoder which conforms to, e.g., the video compression standard such as MPEG-4 Part 10 AVC/H.264 measures the actually generated bit rate on a macroblock in step S200.

The average bit rate on the macroblock is estimated by the long term prediction in step S210. At this, by performing the long term prediction with the kalman filter as the Equation 8, the long term average bit rate $\hat{x}_K(t)$ is obtained.

The variation of the quantization parameter $dq^*(t)$ which satisfies the optimum control condition by using the Hamiltonian according to the long term prediction is calculated in step S220. Here, $dq^*(t)$ is determined with regard to $\hat{x}_K(t)-Y$ as Equation 17.

Meanwhile, independently with the step to estimate the average bit rate on the macroblock by the long term prediction in step S210, the average bit rate on the macroblock is estimated by the short term prediction in step S230. Here, by performing the short term prediction with the FIR filter as the Equation 18, the short term average bit rate $\hat{x}_F(t)$ is obtained.

The variation of the quantization parameter $dq_F^*(t)$ which satisfies the optimum control condition by using the Hamiltonian according to the short term prediction is calculated in step S240. Here, $dq_F^*(t)$ is determined with regard to $(\hat{x}_F(t)-Y)$ as the Equation 19.

Next, in order to perform rate control considering both of the influence according to the long term prediction and the short term prediction, the variation of the quantization coefficient $dq(t)$ is calculated by combining $dq^*(t)$ and $dq_F^*(t)$ in step S250. $dq(t)$ calculated as above is acquired by Equation 20:

$$dq(t) = f(t, dq^*(t), dq_F^*(t)) \quad \text{[Equation 20]}$$

Here, in accordance with an embodiment of the present invention, the variation of the quantization parameter $dq(t)$ calculated by combining $dq^*(t)$ and $dq_F^*(t)$ can be determined by a nonlinear function with regard to a linear combination of $\hat{x}_K(t)-Y$ and $(\hat{x}_F(t)-Y)$ as Equation 21, for example, a nonlinear function including hyperbolic tangent:

$$g(\hat{x}_K, \hat{x}_F) = a\frac{\hat{x}_K - Y}{Y} + b\frac{\hat{x}_F - Y}{Y} \quad \text{[Equation 21]}$$

$$dq(t) = \alpha_s \frac{e^{\lambda g(\hat{x}_K, \hat{x}_F)} - e^{-\lambda g(\hat{x}_K, \hat{x}_F)}}{e^{\lambda g(\hat{x}_K, \hat{x}_F)} + e^{-\lambda g(\hat{x}_K, \hat{x}_F)}} - \beta_s$$

Here, in accordance with an embodiment of the present invention, $\lambda$ as a proportional coefficient can have large value above 20. $\alpha_S$ and $\beta_S$ can be calculated from the upper limit sup $dq(t)$ and the lower limit inf $dq(t)$ of $dq(t)$ according to Equation 22. For example, if the upper limit of $dq(t)$ is imposed to 2 and the lower limit of $dq(t)$ is imposed to $-12$, $\alpha_S$ is 7 and $\beta_S$ is 5 according to Equation 22:

$$\alpha_s = \frac{1}{2}(sup\ dq(t) - inf\ dq(t)) \quad \text{[Equation 22]}$$

$$\beta_s = \alpha_s - sup\ dq(t)$$

Next, the quantization parameter is renewed by adding $dq(t)$ calculated as above to the existing quantization parameter per block in step S260. Because $dq(t)$ can satisfy the optimum control condition of the Equation 15, the optimum rate control per block can be achieved by renewing the quantization parameter as above.

Figure 3:
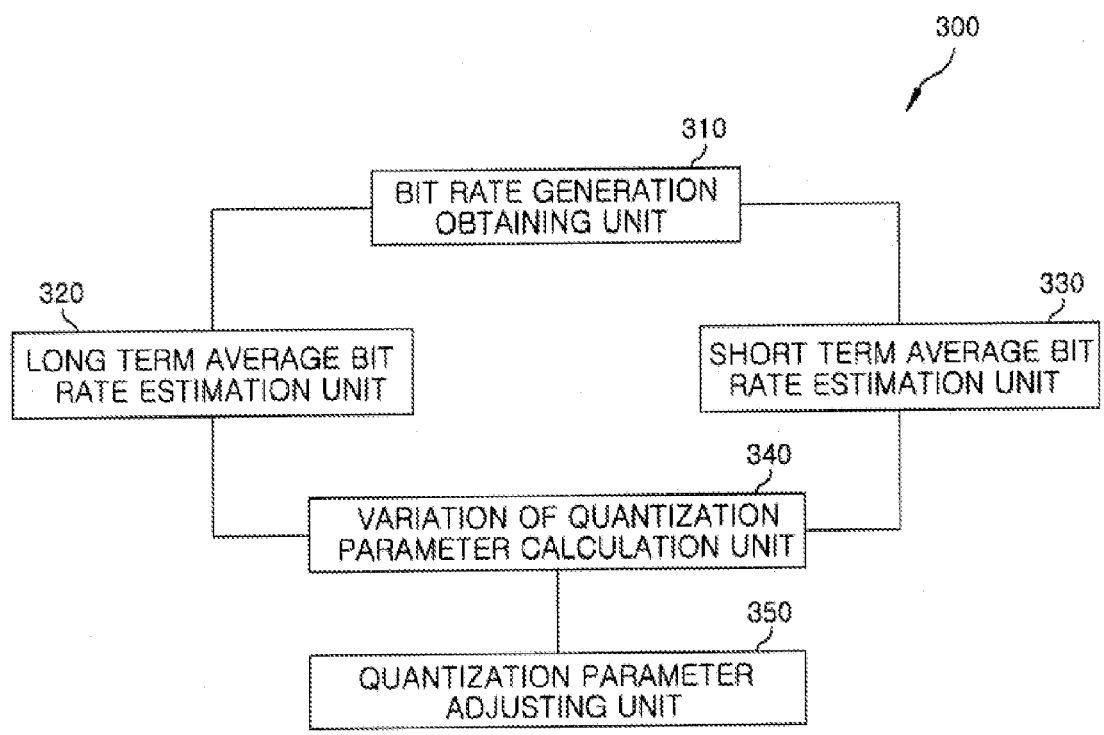
FIG. 3 shows a configuration of a bit rate controller per block in accordance with the embodiment of the present invention.

FIG. 3 shows a configuration of a bit rate controller per block in accordance with an embodiment of the present invention.

A bit rate controller per bit 300 includes a bit rate generation obtaining unit 310, a long term average bit rate estimation unit 320, a short term average bit rate estimation unit 330, a variation of quantization parameter calculation unit 340, and a quantization parameter adjusting unit 350.

The bit rate generation obtaining unit 310 measures an actually generated bit rate of the block. For example, the bit rate controller 170 of the video encoder 100 which conforms to MPEG-4 Part 10 AVC/H.264 includes the bit rate generation obtaining unit 310 of the bit rate controller per bit 300. And the bit rate generation obtaining unit 310 can measure the bit rate of the block from the output of the entropy coding unit 120.

The long term average bit rate estimation unit 320 receives the generated bit rate measured by the bit rate generation obtaining unit 310, to estimate the average bit rate of the block by long term prediction. Here, the long term prediction can be performed by using the Kalman filter as the Equation 8.

The short term average bit rate estimation unit 330 receives the generated bit rate measured by the bit rate generation obtaining unit 310, and estimates the average bit rate of the block by short term prediction. Here, the short term prediction can be performed by using the FIR filter as the Equation 18.

The variation of quantization parameter calculation unit 340 determines the variation of the quantization parameter according to the difference between the average bit rate estimated by the long term prediction and the objective bit rate. For example, by determining the variation of the quantization parameter $dq^*(t)$ as the Equation 17, the bit rate can be controlled and the optimum control condition according to the long term prediction is satisfied. Independently with the above, the variation of quantization parameter calculation unit 340 determines the variation of the quantization parameter $dq_F^*(t)$ according to the difference between the average bit rate estimated by the short term prediction and the objective bit rate. For example, by determining the variation of the quantization parameter as the Equation 19, the optimum control condition according to the short term prediction is satisfied. Meanwhile, the variation of quantization parameter calculation unit 340 can perform rate control considering both of the influence according to the long term prediction and the short term prediction by calculating the variation of the quantization, parameter with combining $dq^*(t)$ and $dq_F^*(t)$. The quantization parameter adjusting unit 350 renews the quantization parameter from the variation of the quantization parameter determined by the variation of quantization parameter calculation unit 340. Here, for example, the bit rate controller 170 of the video encoder 100 which conforms to MPEG-4 Part 10 AVC/H.264 includes the quantization parameter adjusting unit 350 of the bit rate controller per bit 300. And according to the quantization parameter controlled by the quantization parameter adjusting unit 350, the quantization unit 115 of the video encoder 100 can quantize the transformation coefficient.

While the invention has been shown and described with respect to the embodiments, it will be understood by those skilled in the art that various changes and modification may be made without departing from the scope of the invention as defined in the following claims.

What is claimed is:

1. A rate control method per block for a video encoder, the method comprising:
   estimating an average bit rate of a block; and
   determining a variation of a quantization coefficient such that an objective function based on the difference between an objective bit rate and the estimated average bit rate is minimized,
   wherein, in said estimating the average bit rate of the block, the average bit rate is estimated by a long term prediction,
   wherein, in said estimating the average bit rate of the block, the long term prediction is performed by using a Kalman filter,
   wherein, in said estimating the average bit rate of the block, the Kalman filter is acquired by the following Equation:

$$\hat{x}(t+1) = \hat{x}(t) + \frac{1}{t+1}(y(t) - \hat{x}(t))$$

$$\hat{x}(0) = 0$$

where $\hat{x}(t)$ is an estimated average bit rate of $t_{th}$ block by the long term prediction, and $y(t)$ is a measured generation bit rate of $t_{th}$ block.

2. The method of claim 1, wherein, in said determining a variation of a quantization coefficient, the variation is determined such that an optimum control condition calculated by using a Hamiltonian defined from a control input controlling the objective function and the average bit rate is satisfied.

3. The method of claim 2, wherein, in said determining a variation of a quantization coefficient, the optimum control condition depends on the difference between the objective bit rate and the estimated average bit rate.

4. The method of claim 1, wherein, in said determining a variation of a quantization coefficient, the variation is determined to a first constant which is positive number if a value obtained by subtracting the objective bit rate from the estimated average bit rate is larger than a upper limit, to a second constant which is negative number if the value is smaller than a lower limit, and to 0 if the value is smaller than the upper limit and larger than the lower limit.

5. The method of claim 1, wherein, in said estimating the average bit rate of the block, the average bit rate is estimated by a short term prediction.

6. The method of claim 5, wherein, in said estimating the average bit rate of the block, the short term prediction is performed by using a FIR filter.

7. The method of claim 1, wherein said estimating the average bit rate of the block comprises:
   obtaining a long term average bit rate which is an estimated value of the average bit rate by the long term prediction; and
   obtaining a short term average bit rate which is an estimated value of the average bit rate by a short term prediction.

8. The method of claim 7, wherein, in said estimating the average bit rate of the block, the long term prediction is performed by using the Kalman filter and the short term prediction is performed by using a FIR filter.

9. A rate control method per block for a video encoder, the method comprising:
   estimating an average bit rate of a block; and
   determining a variation of a quantization coefficient such that an objective function based on the difference between an objective bit rate and the estimated average bit rate is minimized,
   wherein, in said estimating the average bit rate of the block, the average bit rate is estimated by a short term prediction,
   wherein, in said estimating the average bit rate of the block, the short term prediction is performed by using a FIR filter,
   wherein, in said estimating the average bit rate of the block, the FIR filter is acquired by the following Equation:

$$\hat{x}_F(t+1) = \hat{x}_F(t) + \frac{1}{N_t}(y(t) - y(t - N_t))$$

$$\hat{x}(s) = 0 \ \forall \ s \in [-N_t, 0]$$

where, $\hat{x}_F(t)$ is an estimated average bit rate of $t_{th}$ block by the short term prediction,
   $y(t)$ is a measured generation bit rate of $t_{th}$ block, and
   $N_t$ is the number of taps.

10. The method of claim 7, wherein, in said determining a variation of a quantization coefficient, the variation is determined based on a first variation which is determined according to a difference between the objective bit rate and the long term average bit rate, and a second variation which is determined according to a difference between the objective bit rate and the short term average bit rate.

11. The method of claim 7, wherein the variation is determined by a nonlinear function with regard to a linear combination of the long term average bit rate and the short term average bit rate.

12. A rate control method per block for a video encoder, the method comprising:
   estimating an average bit rate of a block; and
   determining a variation of a quantization coefficient such that an objective function based on the difference between an objective bit rate and the estimated average bit rate is minimized, wherein said estimating the average bit rate of the block comprises:
  obtaining a long term average bit rate which is an estimated value of the average bit rate by a long term prediction; and
  obtaining a short term average bit rate which is an estimated value of the average bit rate by a short term prediction,
wherein the variation is acquired by the following Equation:

$$dq(t) = \alpha_s \frac{e^{\lambda g(\hat{x}_K, \hat{x}_F)} - e^{\lambda g(\hat{x}_K, \hat{x}_F)}}{e^{\lambda g(\hat{x}_K, \hat{x}_F)} + e^{\lambda g(\hat{x}_K, \hat{x}_F)}} - \beta_s$$

where, $dq(t)$ is a variation of a quantization coefficient of $t_{th}$ block,
$\lambda$ is a proportional coefficient,
$\hat{x}_K(t)$ is an estimated average bit rate of $t_{th}$ block by the long term prediction,
$\hat{x}_F(t)$ is an estimated average bit rate of $t_{th}$ block by the short term prediction,
$g(\hat{x}_K, \hat{x}_F)$ is acquired by the following Equation:

$$g(\hat{x}_K, \hat{x}_F) = a\frac{\hat{x}_K - Y}{Y} + b\frac{\hat{x}_F - Y}{Y}$$

If an upper limit of $dq(t)$ is sup $dq(t)$ and a lower limit of $dq(t)$ is inf $dq(t)$, $\alpha_S$ and $\beta_S$ is acquired by the following Equation:

$$\alpha_s = \frac{1}{2}(sup\ dq(t) - inf\ dq(t))$$

$$\alpha_s = \frac{1}{2}(sup\ dq(t) - inf\ dq(t)).$$

* * * * *